(12) United States Patent
Yu

(10) Patent No.: US 11,367,302 B2
(45) Date of Patent: Jun. 21, 2022

(54) INTERFACE DISPLAY METHOD TO REDUCE POWER CONSUMPTION OF ELECTRONIC DEVICE WITH FINGERPRINT SENSOR

(71) Applicant: HUAQIN TECHNOLOGY CO., LTD., Shanghai (CN)

(72) Inventor: Tao Yu, Shanghai (CN)

(73) Assignee: HUAQIN TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/043,202

(22) PCT Filed: Dec. 8, 2018

(86) PCT No.: PCT/CN2018/119949
§ 371 (c)(1),
(2) Date: Sep. 29, 2020

(87) PCT Pub. No.: WO2019/242249
PCT Pub. Date: Dec. 26, 2019

(65) Prior Publication Data
US 2021/0365665 A1   Nov. 25, 2021

(30) Foreign Application Priority Data
Jun. 20, 2018  (CN) .......................... 201810638893.0

(51) Int. Cl.
*G06V 40/12* (2022.01)
*G06F 9/451* (2018.01)
(Continued)

(52) U.S. Cl.
CPC ........ *G06V 40/1365* (2022.01); *G06F 1/3231* (2013.01); *G06F 1/3265* (2013.01);
(Continued)

(58) Field of Classification Search
CPC .............................. G06F 1/3265; G06F 21/32
See application file for complete search history.

(56) References Cited

U.S. PATENT DOCUMENTS

2008/0253624 A1* 10/2008 Wong ................. G06K 9/00013
382/124
2010/0214246 A1   8/2010 Park
(Continued)

FOREIGN PATENT DOCUMENTS

CN         101286190       10/2008
CN         106293711        1/2017
(Continued)

OTHER PUBLICATIONS

English Translation of First office action for China Patent application 201810638893.0; dated Nov. 12, 2019.
(Continued)

*Primary Examiner* — Laurence J Lee
(74) *Attorney, Agent, or Firm* — The PL Law Group, PLLC

(57) ABSTRACT

An interface display method and an electronic device are provided. The interface display method comprises steps of: during processing an interface display request of an application program, determining whether the interface display request meets a preset condition or not (101); if the interface display request meets the preset condition, acquiring at least one fingerprint acquisition area according to the interface display request (102); displaying an interface according to the interface display request (103), and activating a fingerprint recognition sensor corresponding to the at least one fingerprint acquisition area (104); and if the interface display request does not meet the preset condition, displaying the interface according to the interface display request, and controlling the fingerprint recognition sensor of the electronic device to be in an inactive state (105). The method
(Continued)

reduces the power consumption of the electronic device, and prolongs the service life of the electronic device.

13 Claims, 8 Drawing Sheets

(51) Int. Cl.
  *G06F 1/3234* (2019.01)
  *G06F 21/32* (2013.01)
  *G06F 21/84* (2013.01)
  *G07F 9/00* (2006.01)
  *G06F 1/3231* (2019.01)

(52) U.S. Cl.
  CPC .............. *G06F 9/451* (2018.02); *G06F 21/32* (2013.01); *G06F 21/84* (2013.01); *G07F 9/009* (2020.05)

(56) References Cited

U.S. PATENT DOCUMENTS

| | | | |
|---|---|---|---|
| 2017/0237734 A1* | 8/2017 | Hallenborg | H04L 63/0884 726/7 |
| 2017/0371844 A1* | 12/2017 | Yao | G06F 3/04842 |
| 2018/0224999 A1* | 8/2018 | Lee | G06F 3/0488 |
| 2020/0117782 A1* | 4/2020 | Lee | H04N 21/4415 |

FOREIGN PATENT DOCUMENTS

| | | |
|---|---|---|
| CN | 106716297 A | 5/2017 |
| CN | 106951058 A | 7/2017 |
| CN | 107038427 | 8/2017 |
| CN | 107329661 | 11/2017 |

OTHER PUBLICATIONS

English Translation of Second office action for China Patent application 201810638893.0; dated May 6, 2020.
English Translation of International Search Report for International application No. PCT/CN2018/119949, dated Mar. 19, 2019.
English Translation of Written Opinion for International application No. PCT/CN2018/119949, dated Mar. 19, 2019.
International Search Report for International application No. PCT/CN2018/119949, dated Mar. 19, 2019.
Written Opinion for International application No. PCT/CN2018/119949, dated Mar. 19, 2019.
International Preliminary Report on Patentability International application No. PCT/CN2018/119949, dated Dec. 22, 2020.
International Preliminary Report on Patentability, English Translation, International application No. PCT/CN2018/119949, dated Dec. 22, 2010.
First office action for China Patent application 201810638893.0; dated Oct. 12, 2019.
Second office action for China Patent application 201810638893.0; dated May 6, 2020.
Office action dated Sep. 30, 2020 from China Patent Office in a counterpart China Patent Application No. 201810638893.0 (English translation is also submitted herewith.).

* cited by examiner

INTERFACE DISPLAY METHOD TO REDUCE POWER CONSUMPTION OF ELECTRONIC DEVICE WITH FINGERPRINT SENSOR

CROSS-REFERENCE TO RELATED APPLICATIONS

This application is a national phase filing under 35 U.S.C. § 371 of PCT International Application PCT/CN2018/119949, filed Dec. 8, 2018, and published under PCT Article 21(2) in Chinese as WO/2019/242249 on Dec. 26, 2019. PCT/CN2018/119949 claimed priority benefit of China Patent Application No. 201810638893.0 filed Jun. 20, 2018. The above identified applications are hereby incorporated by reference in their entirety.

TECHNICAL FIELD

Embodiments of the present application relate to the technical field of computers, and in particular to an interface display method and an electronic device.

BACKGROUND

Fingerprint has almost become a byword for biometric identification due to its lifetime invariance, uniqueness and convenience. Fingerprint recognition devices have also been widely used in various electronic devices, such as mobile phones, tablet computers, and the like. At present, some manufacturers prepare to install a fingerprint recognition device under a touch screen to realize fingerprint recognition under the screen.

The inventor found that at least the following problems exist in the prior art: in order to facilitate the fingerprint recognition operation of a user, the fingerprint recognition device under the touch screen is always activated, resulting in increased power consumption of the electronic device and shortened service time.

SUMMARY

Embodiments of the present application aim to provide an interface display method and an electronic device, which reduce power consumption of the electronic device and thereby prolong the service life of the electronic device.

In order to solve the above technical problem, an embodiment of the present application provides an interface display method, comprising: during processing an interface display request of an application program, determining whether the interface display request meets a preset condition or not; if the interface display request meets the preset condition, acquiring at least one fingerprint acquisition area according to the interface display request; displaying an interface according to the interface display request, and activating a fingerprint recognition sensor corresponding to the at least one fingerprint acquisition area; and if the interface display request does not meet the preset condition, displaying an interface according to the interface display request, and controlling the fingerprint recognition sensor of the electronic device to be in an inactive state.

An embodiment of the present application further provides an electronic device, comprising at least one processor, a display screen, a fingerprint recognition sensor, and a memory; the display screen, the fingerprint recognition sensor and the memory are communicatively connected to the at least one processor respectively; wherein a fingerprint recognition area of the fingerprint recognition sensor is located in at least part of a display area of the display screen; the memory stores instructions executable by the at least one processor and the instructions, when executed by the at least one processor, enable the at least one processor to perform the above interface display method.

An embodiment of the present application further provides a computer readable storage medium, wherein a computer program, when executed by a processor, implements the above interface display method.

Compared with the prior art, the embodiment of the present application comprises: during processing an interface display request of an application program, determining whether the interface display request meets a preset condition or not; if the interface display request meets the preset condition, acquiring at least one fingerprint acquisition area according to the interface display request; when displaying an interface according to the interface display request, only activating a fingerprint recognition sensor corresponding to the fingerprint acquisition area; and if the interface display request does not meet the preset condition, displaying the interface according to the interface display request, and controlling the fingerprint recognition sensor of the electronic device to be in an inactive state. That is, during the process of using the application program by the user, if fingerprint recognition is required on a certain interface, only the fingerprint recognition sensor in the fingerprint acquisition area on the interface is activated, without the need of activating all the fingerprint recognition sensors; if fingerprint recognition is not required on the interface, all the fingerprint recognition sensors are controlled to be in an inactive state, so as to reduce the power consumption of the electronic device, and prolong the service life of the electronic device.

In addition, the preset condition is that the interface display request contains a preset fingerprint identifier. The present embodiment provides a specific content of the preset condition.

In addition, the fingerprint identifier may be contained in the interface display request by: adding the fingerprint identifier in a description of an area requiring fingerprint acquisition of the interface display request; and specifically, acquiring at least one fingerprint acquisition area according to the interface display request may comprise: acquiring the at least one fingerprint acquisition area corresponding to the fingerprint identifier from the display interface request. The embodiment provides a specific setting manner of the fingerprint identifier.

In addition, after displaying the interface according to the interface display request, the method further comprises: determining whether or not the at least one fingerprint acquisition area can respond to a touch event; and if the at least one fingerprint acquisition area can respond to the touch event, activating the fingerprint recognition sensor corresponding to the at least one fingerprint acquisition area. In the embodiment, only when the fingerprint acquisition area can respond to the touch event, the fingerprint recognition sensor corresponding to the fingerprint acquisition area is activated, thereby further reduce the power consumption.

In addition, determining whether or not the at least one fingerprint acquisition area can respond to a touch event may specifically comprise: determining whether or not the at least one fingerprint acquisition area is shielded; if the at least one fingerprint acquisition area is not shielded, determining whether or not the at least one fingerprint acquisition area is operable; if the at least one fingerprint acquisition area is operable, deciding that the at least one fingerprint acquisition area can respond to the touch event. The present embodiment provides a specific implementation for determining whether or not the at least one fingerprint acquisition area can respond to a touch event.

In addition, the fingerprint acquisition area is a rectangle, and acquiring at least one fingerprint acquisition area according to the interface display request may specifically comprise: acquiring coordinates of two vertexes on a diagonal line of the at least one fingerprint acquisition area according to the interface display request. The present embodiment provides a specific implementation for acquiring the fingerprint acquisition area.

In addition, activating a fingerprint recognition sensor corresponding to the at least one fingerprint acquisition area may specifically comprise: transmitting driving parameters to a driving module; wherein the driving parameters include an activating instruction and information characterizing the at least one fingerprint acquisition area; and activating the fingerprint recognition sensor corresponding to the at least one fingerprint acquisition area through the driving module. The present embodiment provides a specific implementation for activating a fingerprint recognition sensor corresponding to the at least one fingerprint acquisition area.

In addition, the fingerprint recognition sensor is an optical fingerprint recognition sensor; the optical fingerprint recognition sensor reuses at least part of self-luminous display pixels of the display screen as a light source.

BRIEF DESCRIPTION OF THE DRAWINGS

One or more embodiments are illustrated by way of example in the accompanying drawings which correspond to and are not to be construed as limiting the embodiments, in which elements having the same reference numerals represent like elements, and in which the drawings are not to be construed as limiting in scale unless otherwise specified.

DETAILED DESCRIPTION

To make the objects, technical solutions and advantages of the embodiments of the present application more clear, embodiments of the present application will be described in detail below with reference to the accompanying drawings.

However, it will be appreciated by those of ordinary skill in the art that numerous technical details are set forth in order to provide a better understanding of the present application in various embodiments of the present application. However, the technical solution claimed in the present application can be implemented even without these technical details and various changes and modifications based on the following embodiments.

A first embodiment of the present application relates to an interface display method, which is applied to an electronic device, such as a mobile phone, a tablet computer, and the electronic device has a display screen and a fingerprint recognition sensor, wherein the fingerprint recognition sensor is located under the display screen, and a fingerprint recognition area of the fingerprint recognition sensor is located in at least part of a display area. The fingerprint recognition sensor can be an optical fingerprint recognition sensor, and preferably, the optical fingerprint recognition sensor reuses at least part of self-luminous display pixels of the display screen as a light source.

Figure 1:
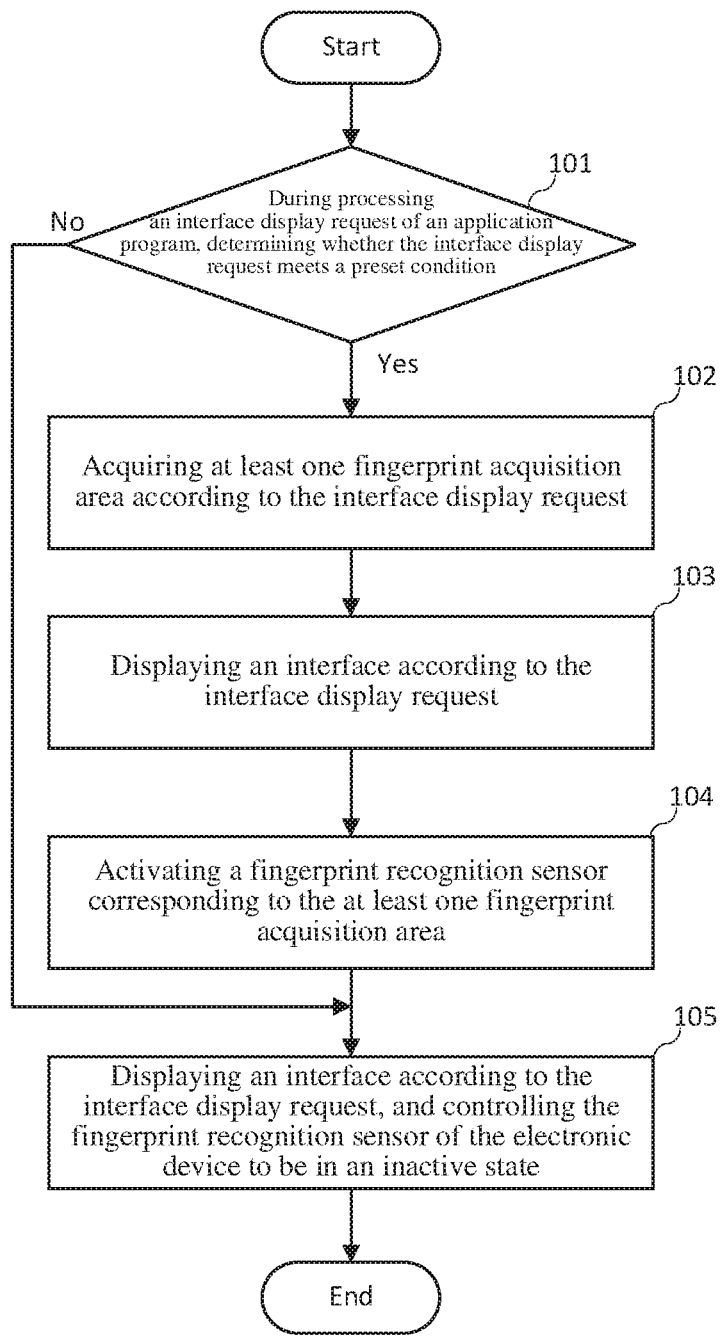
FIG. 1 is a detailed flowchart of an interface display method according to a first embodiment of the present application.

A detailed flowchart of the interface display method according to the present embodiment is shown in FIG. 1.

Step 101: during processing an interface display request of an application program, determining whether the interface display request meets a preset condition or not. If yes, enter step 102; if not, jump to step 105.

Specifically, in the electronic device, the system framework is responsible for interface display, event processing, and the like of an application program. When a user opens a certain application program, during processing an interface display request of the application program, the system framework determines whether the interface display request meets a preset condition or not; if the interface display request meets the preset condition, enter step 102; otherwise, jump to step 105.

Step 102: acquiring at least one fingerprint acquisition area according to the interface display request.

Specifically, the system framework acquires an area requiring fingerprint acquisition from the interface display request, namely, acquiring the fingerprint acquisition area, wherein there can be one or more fingerprint acquisition areas. The fingerprint acquisition area is located in at least part of the fingerprint recognition area.

Step 103: displaying an interface according to the interface display request.

Specifically, the system framework controls the display area of the display screen to display the interface according to the interface display request.

Step 104: activating a fingerprint recognition sensor corresponding to the at least one fingerprint acquisition area.

Figure 2:
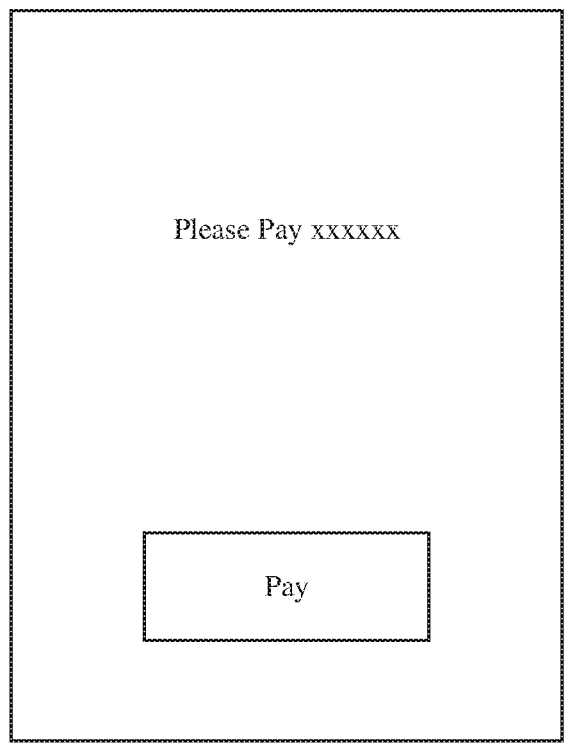
FIG. 2 is a schematic view of a payment interface of an electronic device according to the first embodiment of the present application.

Specifically, part of the fingerprint recognition sensors under the screen corresponding to the at least one fingerprint acquisition area is activated, so that when a user touches the fingerprint acquisition area with a finger, the fingerprint of the user is acquired for fingerprint verification, and when the verification is passed, a corresponding function may be performed. Referring to FIG. 2, the electronic device is displaying a payment interface, and the area where the payment button is located is the fingerprint acquisition area; at this time, the fingerprint recognition sensor corresponding to the area where the payment button is located is activated; when the user clicks the payment button with a finger, the fingerprint of the user is acquired for fingerprint verification, and when the verification is passed, the payment operation is performed.

Step 105: displaying an interface according to the interface display request, and controlling the fingerprint recognition sensor of the electronic device to be in an inactive state.

Figure 3:
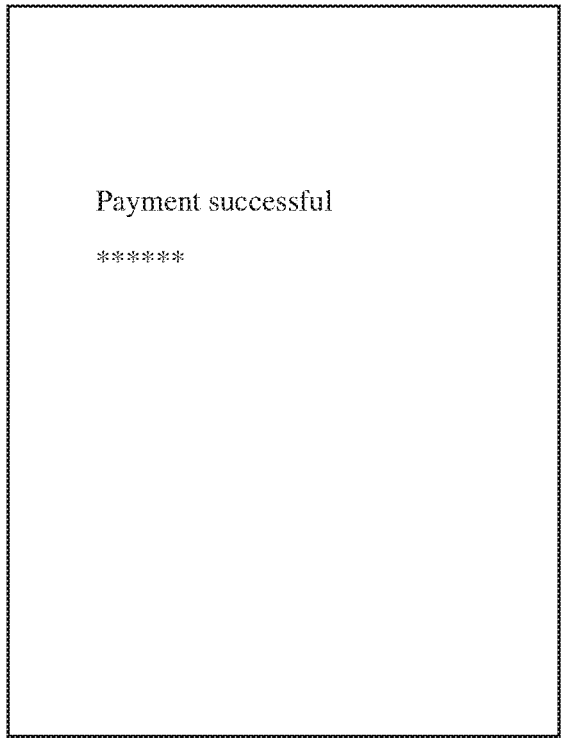
FIG. 3 is a schematic view of a payment completion interface of an electronic device according to the first embodiment of the present application.

Specifically, when it is determined that the interface display request does not meet the preset condition, the system framework controls the display area of the display screen to display the interface according to the interface display request, and controls all the fingerprint recognition sensors of the electronic device to be in an inactive state. The following two cases are specifically involved: in the first case, when a previous interface is displayed, the fingerprint recognition sensor is not activated, then the fingerprint recognition sensor is kept in an inactive state; in the second case, when the previous interface is displayed, the fingerprint recognition sensor is activated, for example, the previous interface is a payment interface, please refer to FIG. 2, then the fingerprint recognition sensor corresponding to the area where the payment button is located is in an active state; when the electronic device completes payment, the displayed interface is a payment success interface, please refer to FIG. 3, and at this time, the fingerprint recognition sensor corresponding to the area where the payment button is located is controlled to be inactive.

Compared with the prior art, the embodiment of the present application comprises: during processing an interface display request of an application program, determining whether the interface display request meets a preset condition or not; if the interface display request meets the preset condition, acquiring at least one fingerprint acquisition area according to the interface display request; when displaying an interface according to the interface display request, only activating a fingerprint recognition sensor corresponding to the fingerprint acquisition area; and if the interface display request does not meet the preset condition, displaying an interface according to the interface display request, and controlling the fingerprint recognition sensor of the electronic device to be in an inactive state. That is, in the process of using the application program by the user, if fingerprint recognition is required on a certain interface, only the fingerprint recognition sensor in the fingerprint acquisition area on the interface is activated, without the need of activating all the fingerprint recognition sensors; if fingerprint recognition is not required on the interface, all the fingerprint recognition sensors are controlled to be in an inactive state, so as to reduce the power consumption of the electronic device, and prolong the service life of the electronic device.

The second embodiment of the present application relates to an interface display method, which is a refinement of the first embodiment, and the main refinement is that: specific content of a preset condition is provided.

Figure 4:
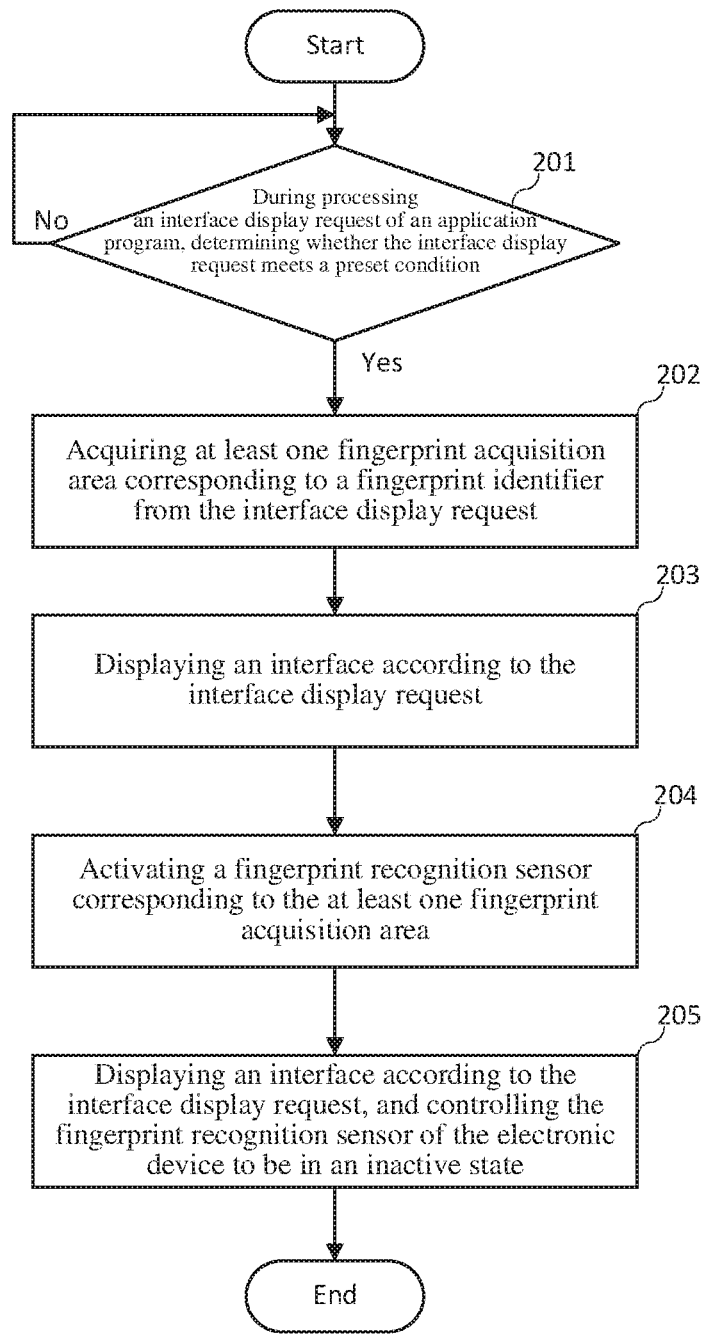
FIG. 4 is a detailed flowchart of an interface display method according to a second embodiment of the present application.

FIG. 4 shows a detailed flowchart of the interface display method according to the present embodiment.

Steps 203 to 205 are substantially the same as steps 103 to 105, and thus are not repeated herein. The main difference resides in:

step 201: during processing an interface display request of an application program, determining whether the interface display request meets a preset condition or not. If yes, enter step 202; if not, jump to step 205.

Specifically, the preset condition is that the interface display request contains a preset fingerprint identifier; the fingerprint identifier is contained in the interface display request by: adding the fingerprint identifier in a description of an area requiring fingerprint acquisition of the interface display request. During processing an interface display request of an application program, the system framework determines whether the interface display request meets a preset condition or not, namely determining whether or not the interface display request contains a preset fingerprint recognition; if the interface display request contains the preset fingerprint recognition, enter step 202; otherwise, jump to step 205: displaying an interface according to the interface display request, and controlling fingerprint recognition sensors of the electronic device to be in an inactive state.

The area requiring fingerprint acquisition can be designed to be a rectangle, then coordinates of two vertexes on a diagonal line can be used to describe the area requiring fingerprint acquisition.

Step 202: acquiring at least one fingerprint acquisition area corresponding to the fingerprint identifier from the display interface request.

Specifically, an area with a fingerprint identifier in its description is acquired from the interface display request as the fingerprint acquisition area, and coordinates of two vertexes on a diagonal line of the fingerprint acquisition area are acquired to describe the fingerprint acquisition area. There may be one or more fingerprint acquisition areas.

Compared with the first embodiment, the present embodiment provides specific content of a preset condition, where the preset condition is that the interface display request contains a preset fingerprint identifier; meanwhile, a specific setting of the fingerprint identifier is provided.

The third embodiment of the present application relates to an interface display method, which is an improvement on the basis of the first embodiment, and the main improvement lies in: determining whether or not the at least one fingerprint acquisition area can respond to a touch event.

Figure 5:
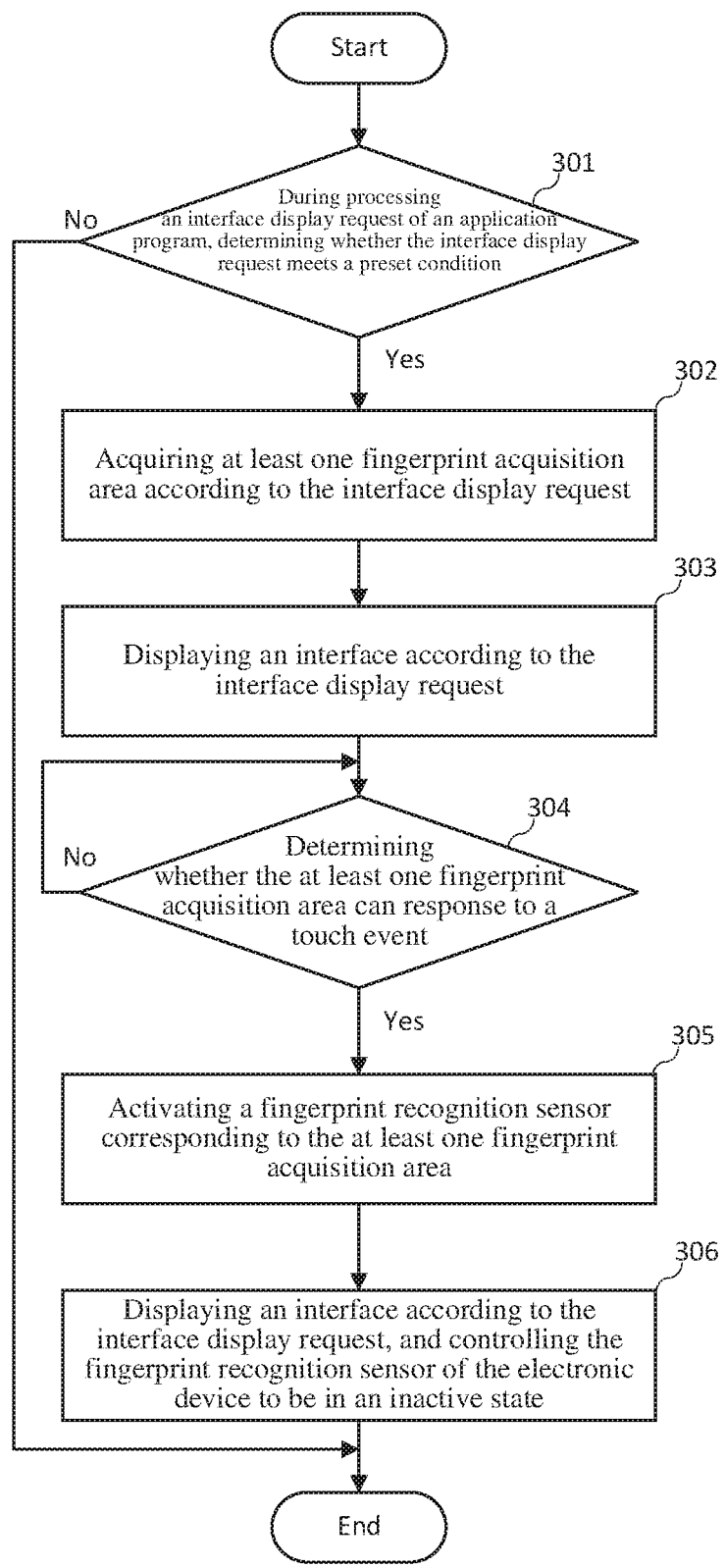
FIG. 5 is a detailed flowchart of an interface display method according to a third embodiment of the present application.

FIG. 5 shows a detailed flowchart of the interface display method according to the present embodiment.

Steps 301 to 303 are substantially the same as steps 101 and 103, and steps 305 and 306 are substantially the same as steps 104 and 105, which are not repeated herein again. The main difference is in the addition of step 304 as follows:

Step 304: determining whether or not the at least one fingerprint acquisition area can respond to a touch event. If yes, enter step 305; if not, go back to step 304.

Specifically, determining whether or not the at least one fingerprint acquisition area can respond to the touch event is to determine whether or not the at least one fingerprint acquisition area can be touched by a user; if the at least one fingerprint acquisition area can be touched by the user, go to step 305 to activate a fingerprint recognition sensor corresponding to the at least one fingerprint acquisition area; otherwise, go back to step 304 to continue to determine whether or not the at least one fingerprint acquisition area can respond to a touch event.

Compared with the first embodiment, the present embodiment actives the fingerprint recognition sensor corresponding to the fingerprint acquisition area only when the fingerprint acquisition area can respond to a touch event, thereby further reducing the power consumption. It should be noted that, the present embodiment can also serve as an improvement on the basis of the second embodiment, and can achieve the same technical effect.

The fourth embodiment of the present application relates to an interface display method, which is a refinement of the third embodiment, and the main refinement lies in that: a specific implementation for determining whether the at least one fingerprint acquisition area can respond to a touch event is provided.

Figure 6:
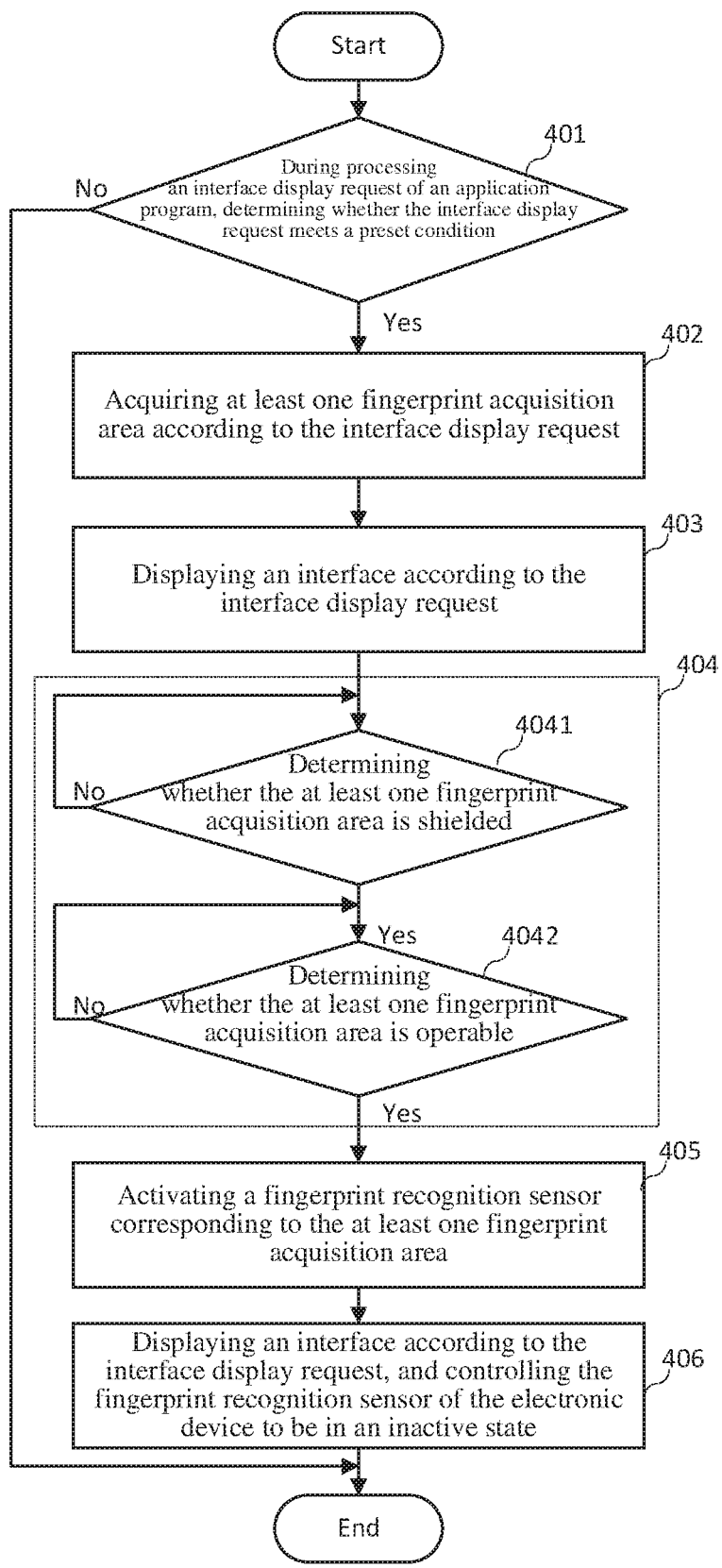
FIG. 6 is a detailed flowchart of an interface display method according to a fourth embodiment of the present application.

FIG. 6 shows a detailed flowchart of the interface display method according to the present embodiment.

Steps 401 to 403 are substantially the same as steps 301 and 303, and steps 405 and 406 are substantially the same as steps 305 and 306, which are not repeated herein, and the main difference is that step 404 specifically comprises the following sub-steps:

Sub-step 4041: determining whether or not the at least one fingerprint acquisition area is shielded. If yes, go to sub-step 4042; if not, go back to sub-step 4041.

Specifically, determining whether or not the at least one fingerprint acquisition area is shielded is to determine whether or not the at least one fingerprint acquisition area is shielded by another prompt information popup window; if determining that the at least one fingerprint acquisition area is not shielded by another prompt information popup window, this shows that the at least one fingerprint recognition area can carry out normal fingerprint acquisition, and go to the sub-step 4042; otherwise, it shows that the at least one fingerprint acquisition area cannot acquire fingerprint due to being shielded; even if the fingerprint recognition sensor corresponding to the at least one fingerprint acquisition area is activated, fingerprint acquisition cannot be performed, and at this moment, the flow waits for the user to close the prompt information popup window, and goes back to the sub-step 4041 to continuously determine whether or not the at least one fingerprint acquisition area is shielded.

Sub-step 4042: determining whether or not the at least one fingerprint acquisition area is operable. If yes, go to step 405; if not, go back to the sub-step 4042.

Specifically, determining whether or not the at least one fingerprint acquisition area is operable is to determine whether there is another interface currently in an operating state; if it is determined that there is no other interface currently in an operating state, go to step 405 to activate a fingerprint recognition sensor corresponding to the at least one fingerprint acquisition area; otherwise, it shows that there are other interfaces currently in the operating state, then the flow waits for the user to complete the operation of the interface, and then goes back to the sub-step 4042 to continuously determine whether the at least one fingerprint acquisition area is operable.

This embodiment provides a specific implementation for determining whether the at least one fingerprint acquisition area can respond to a touch event, compared with the third embodiment.

The fifth embodiment of the present application relates to an interface display method, which is a refinement of the first embodiment, and the main refinement lies in that: a specific implementation for activating a fingerprint recognition sensor corresponding to the at least one fingerprint acquisition area is provided.

Figure 7:
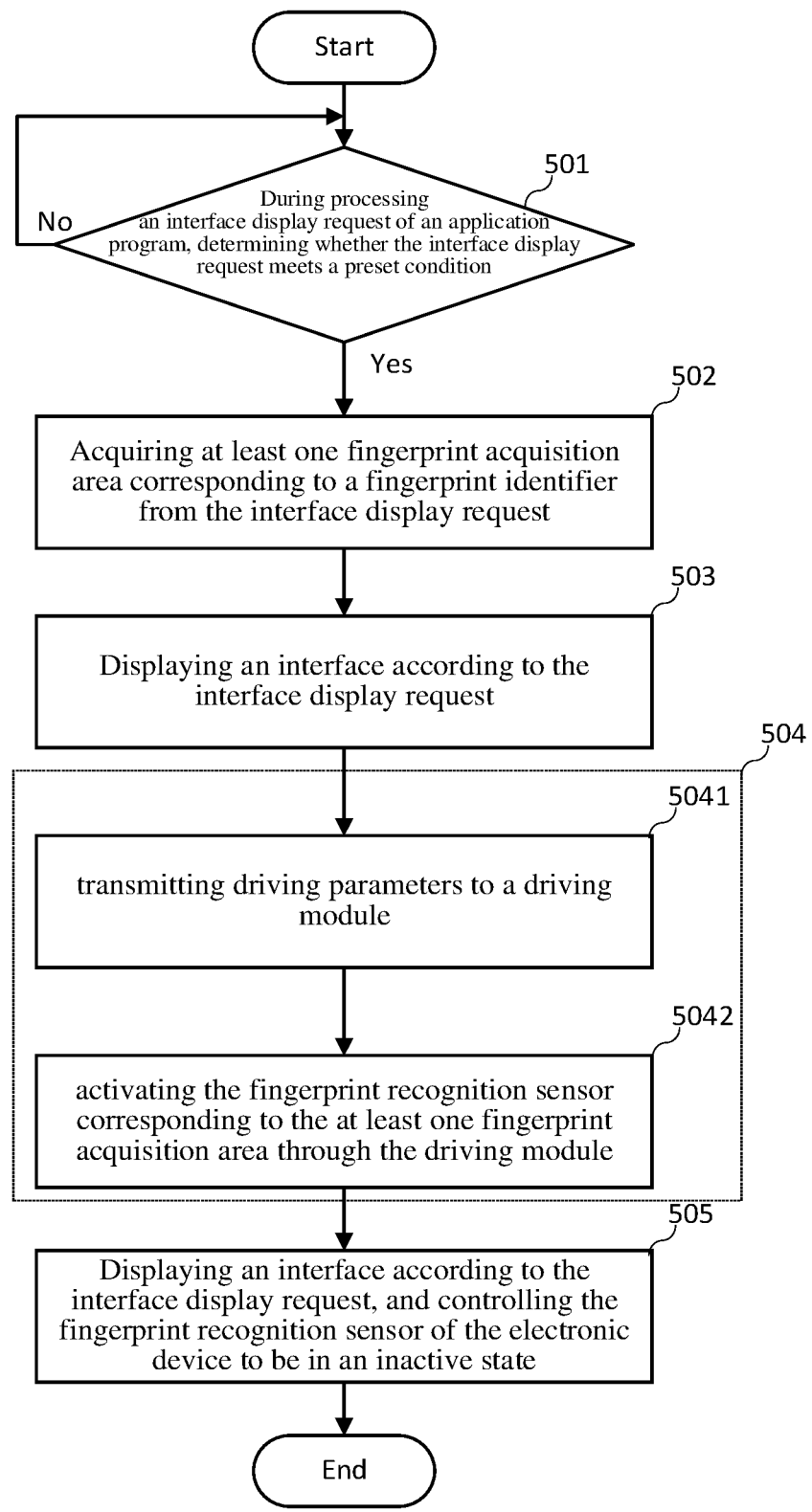
FIG. 7 is a detailed flowchart of an interface display method according to a fifth embodiment of the present application.

FIG. 7 shows a detailed flowchart of the interface display method according to the present embodiment.

Steps 501 to 503 are substantially the same as steps 101 to 103, and step 505 is substantially the same as step 105, which are not repeated herein, and the main difference is that step 504 specifically comprises the following sub-steps:

Sub-step 5041: transmitting driving parameters to a driving module; wherein the driving parameters include an activating instruction and information characterizing the at least one fingerprint acquisition area.

Specifically, the system framework transmits the activating instruction and the information characterizing the at least one fingerprint acquisition area to the drive module in the kernel by means of system calls. The fingerprint acquisition area is, for example, a rectangle, then the information characterizing the at least one fingerprint acquisition area may be coordinates of two vertices on a diagonal line of the fingerprint acquisition area.

Sub-step 5042: activating the fingerprint recognition sensor corresponding to the at least one fingerprint acquisition area through the driving module.

Specifically, the driving module finds and activate the fingerprint recognition sensor corresponding to the at least one fingerprint acquisition area according to the information characterizing the at least one fingerprint acquisition area.

It should be noted that, the manner of activating the fingerprint recognition sensor according to the present embodiment is also applicable to the operation of inactivating the fingerprint recognition sensor.

Compared with the first embodiment, the present embodiment provides a specific implementation for activating the fingerprint recognition sensor corresponding to the at least one fingerprint acquisition area. It should be noted that, the present embodiment can also serve as a refinement on the basis of any of the second to fourth embodiments, and can achieve the same technical effect.

Figure 8:
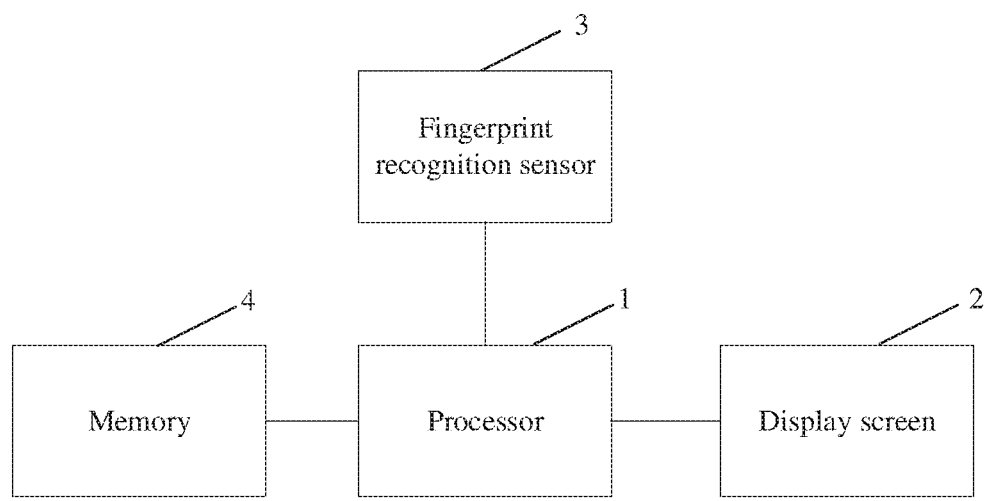
FIG. 8 is a block schematic view of an electronic device according to a sixth embodiment of the present application.

The sixth embodiment of the present application relates to an electronic device, such as a mobile phone, a tablet computer and the like. As shown in FIG. 8, the electronic device comprises at least one processor 1, a display screen 2, a fingerprint recognition sensor 3 and a memory 4; and the display screen 2, the fingerprint recognition sensor 3 and the memory 4 are respectively communicatively connected to the at least one processor 1;

wherein the fingerprint recognition sensor 3 is located under the display screen 2, and a fingerprint recognition area of the fingerprint recognition sensor 3 is located in at least part of a display area of the display screen 2.

The memory 4 stores instructions executable by the at least one processor 1, to enable the at least one processor 1 to perform the interface display method according to any of the first to fifth embodiments.

The memory 4 and the processor 1 are connected by means of a bus, the bus may comprise any number of interconnected buses and bridges, and the bus connects various circuits of the one or more processor 1 and the memory 4 together. The bus may also connect various other circuits such as peripherals, voltage regulators, power management circuits, etc., which are well known in the art, and therefore, will not be described further herein. A bus interface provides an interface between the bus and a transceiver. The transceiver may be one element or a plurality of elements, such as a plurality of receivers and transmitters, providing units for communicating with various other devices over a transmission medium. The data processed by the processor 1 is trans ted over a wireless medium via an antenna, which further receives data and transmits the data to the processor 1.

The processor 1 is responsible for managing the bus and general processing and may also provide various functions including timing, peripheral interfaces, voltage regulation, power management and other control functions, while the memory 4 may be used to store data used by the processor 1 during performing operations.

The memory 4, as a non-transitory computer readable storage medium, can be used to store non-transitory software programs, non-transitory computer executable programs and modules, such as program instructions/modules corresponding to a dual-camera focusing method in the embodiment of the present application. The processor 1 performs various functional applications of the server and data processing by executing the non-transitory software programs, instructions and modules stored in the memory 4, i.e., implementing the interface display method in the above method embodiments.

The memory 4 may include a program storage area and a data storage area, wherein the program storage area may store an operating system, an application program required for at least one function; the data storage area may store data created according to the use of application icon-based interactive methods, and the like. Further, the memory 4 may include high speed random access memory, and may also include non-transitory memory, such as at least one magnetic disk storage device, flash memory device, or other non-transitory solid state storage device. In some embodiments, the memory 4 optionally includes a memory located remotely from the processor 1, which may be connected to the dual-camera focusing device over a network. Examples of such network include, but are not limited to, the Internet, intranet, local area network, mobile communication network, and combinations thereof.

The one or more modules are stored in the memory 4 and, when executed by the one or more processors 1, perform the interface display method of any of the above method embodiments.

The product can perform the interface display method provided by any embodiment of the present application, and has corresponding functional modules for performing the method and beneficial effects thereof. For technical details that are not described in detail in this embodiment, reference may be made to the interface display method provided in the embodiment of the present application.

The electronic device according to the embodiment of the present application exist in a variety of forms, including but not limited to:

(1) mobile communication devices: such devices are characterized by mobile communication capabilities and are primarily targeted at providing voice and data communications. Such terminals include smart phones (e.g., iPhone), multimedia phones, functional phones, and low-end phones, among others.

(2) ultra-mobile personal computer devices: such devices belong to the category of personal computers, have computing and processing functions and generally have mobile Internet characteristics. Such terminals include PDA, MID, and UMPC devices, such as iPad.

(3) portable entertainment devices: such devices may display and play multimedia content. Such devices include audio and video players (e.g., iPod), handheld game consoles, electronic books, smart toys and portable car navigation devices.

(4) servers: which are devices for providing services. The server comprises a processor, a hard disk, a memory, a system bus and the like, is similar to a general computer architecture, but has higher requirements on processing capacity, stability, reliability, safety, expandability, manageability and the like because of the need of providing high-reliability services.

(5) other electronic devices with data interaction functions.

Compared with the prior art, the present embodiment comprises: during processing an interface display request of an application program, determining whether the interface display request meets a preset condition or not; if the interface display request meets the preset condition, acquiring at least one fingerprint acquisition area according to the interface display request; when displaying an interface according to the interface display request, only activating a fingerprint recognition sensor corresponding to the fingerprint acquisition area; and if the interface display request does not meet the preset condition, displaying the interface according to the interface display request, and controlling the fingerprint recognition sensor of the electronic device to be in an inactive state. That is, in the process of using the application program by the user, if fingerprint recognition is required on a certain interface, only the fingerprint recognition sensor in the fingerprint acquisition area on the interface is activated, without the need of activating all the fingerprint recognition sensors; if fingerprint recognition is not required on the interface, all the fingerprint recognition sensors are controlled to be in an inactive state, so as to reduce the power consumption of the electronic device, and prolong the service life of the electronic device.

The sixth embodiment of the present application relates to a computer-readable storage medium storing a computer program, which when executed by a processor, implements the above method embodiments.

An embodiment of the present application further relates to a computer program product comprising: a computer program stored on a non-transitory computer readable storage medium, the computer program comprising program instructions which, when executed by a computer, cause the computer to perform the interface display method in any of the above method embodiments.

That is, as can be understood by those skilled in the art, all or part of the steps in the method according to the above embodiments may be implemented by a program instructing relevant hardware, where the program is stored in a storage medium and includes several instructions to enable a device (which may be a single chip, a chip, or the like) or a processor to perform all or part of the steps in the method according to the embodiments of the present application. The aforementioned storage medium includes: a U-disk, a removable hard disk, a Read-Only Memory (ROM), a Random Access Memory (RAM), a magnetic disk, or an optical disk, and various media capable of storing program codes.

It will be understood by those of ordinary skill in the art that the above embodiments are specific examples for implementing the present application, and that various changes in form and detail may be made therein in actual applications without departing from the spirit and scope of the present application.

What is claimed is:

1. An interface display method, comprising:
during processing an interface display request of an application program, determining whether the interface display request meets a preset condition or not;
if the interface display request meets the preset condition, acquiring at least one fingerprint acquisition area according to the interface display request;
displaying an interface according to the interface display request, and activating a fingerprint recognition sensor corresponding to the at least one fingerprint acquisition area; and
if the interface display request does not meet the preset condition, displaying the interface according to the interface display request, and controlling the fingerprint recognition sensor of the electronic device to be in an inactive state,
wherein the preset condition is that the interface display request contains a preset fingerprint identifier;
wherein after displaying the interface according to the interface display request, the method further comprises:
determining whether or not the at least one fingerprint acquisition area can respond to a touch event; and if the at least one fingerprint acquisition area can respond to a touch event, activating the fingerprint recognition sensor corresponding to the at least one fingerprint acquisition area;
wherein said determining whether or not the at least one fingerprint acquisition area can respond to a touch event specifically comprises:
determining whether or not the at least one fingerprint acquisition area is shielded;
if the at least one fingerprint acquisition area is not shielded, determining whether or not the at least one fingerprint acquisition area is operable; and
if the at least one fingerprint acquisition area is operable, determining that the at least one fingerprint acquisition area can respond to a touch event.

2. The interface display method according to claim 1, wherein the fingerprint identifier is contained in the interface display request by: adding the fingerprint identifier in a description of an area requiring fingerprint acquisition of the interface display request; and
said acquiring at least one fingerprint acquisition area according to the interface display request specifically comprises:
acquiring the at least one fingerprint acquisition area corresponding to the fingerprint identifier from the display interface request.

3. The interface display method according to claim 1, wherein the fingerprint acquisition area is a rectangle, and said acquiring at least one fingerprint acquisition area according to the interface display request specifically comprises:
acquiring coordinates of two vertexes on a diagonal line of the at least one fingerprint acquisition area according to the interface display request.

4. The interface display method according to claim 1, wherein said activating a fingerprint recognition sensor corresponding to the at least one fingerprint acquisition area specifically comprises:
transmitting driving parameters to a driving module; wherein the driving parameters include an activating instruction and information characterizing the at least one fingerprint acquisition area; and
activating the fingerprint recognition sensor corresponding to the at least one fingerprint acquisition area through the driving module.

5. An electronic device, comprising at least one processor, a display screen, a fingerprint recognition sensor, and a memory; the display screen, the fingerprint recognition sensor and the memory are respectively communicatively connected to the at least one processor; wherein a fingerprint recognition area of the fingerprint recognition sensor is located in at least part of a display area of the display screen;
the memory stores instructions executable by the at least one processor to enable the at least one processor to perform:
during processing an interface display request of an application program, determining whether the interface display request meets a preset condition or not;
if the interface display request meets the preset condition, acquiring at least one fingerprint acquisition area according to the interface display request;
displaying an interface according to the interface display request, and activating a fingerprint recognition sensor corresponding to the at least one fingerprint acquisition area; and
if the interface display request does not meet the preset condition, displaying the interface according to the interface display request, and controlling the fingerprint recognition sensor of the electronic device to be in an inactive state,
wherein the preset condition is that the interface display request contains a preset fingerprint identifier;
wherein the processor is further configured to perform, after displaying the interface according to the interface display request:
determining whether or not the at least one fingerprint acquisition area can respond to a touch event: and
if the at least one fingerprint acquisition area can respond to a touch event, activating the fingerprint recognition sensor corresponding to the at least one fingerprint acquisition area;
wherein the processor is further configured to determine whether or not the at least one fingerprint acquisition area can respond to a touch event specifically by:
determining whether or not the at least one fingerprint acquisition area is shielded;
if the at least one fingerprint acquisition area is not shielded, determining whether or not the at least one fingerprint acquisition area is operable; and
if the at least one fingerprint acquisition area is operable, determining that the at least one fingerprint acquisition area can respond to a touch event.

6. The electronic device according to claim 5, wherein the fingerprint recognition sensor is an optical fingerprint recognition sensor; and
the optical fingerprint recognition sensor reuses at least part of self-luminous display pixels of the display screen as a light source.

7. The electronic device according to claim 5, wherein the fingerprint identifier is contained in the interface display request by: adding the fingerprint identifier in a description of an area requiring fingerprint acquisition of the interface display request; and the processor is further configured to perform:
acquiring the at least one fingerprint acquisition area corresponding to the fingerprint identifier from the display interface request.

8. The electronic device according to claim 5, wherein the fingerprint acquisition area is a rectangle, and the processor is further configured to acquire at least one fingerprint acquisition area according to the interface display request specifically by:
acquiring coordinates of two vertexes on a diagonal line of the at least one fingerprint acquisition area according to the interface display request.

9. The electronic device according to claim 5, wherein the processor is further configured to activate a fingerprint recognition sensor corresponding to the at least one fingerprint acquisition area specifically by:
transmitting driving parameters to a driving module; wherein the driving parameters include an activating instruction and information characterizing the at least one fingerprint acquisition area; and
activating the fingerprint recognition sensor corresponding to the at least one fingerprint acquisition area through the driving module.

10. A non-transitory computer readable storage medium having stored thereon a computer program, wherein the computer program, when executed by a processor, implements an interface display method comprising:
during processing an interface display request of an application program, determining whether the interface display request meets a preset condition or not;

if the interface display request meets the preset condition, acquiring at least one fingerprint acquisition area according to the interface display request;
displaying an interface according to the interface display request, and activating a fingerprint recognition sensor corresponding to the at least one fingerprint acquisition area; and
if the interface display request does not meet the preset condition, displaying the interface according to the interface display request, and controlling the fingerprint recognition sensor of the electronic device to be in an inactive state,
wherein the preset condition is that the interface display request contains a preset fingerprint identifier;
wherein after displaying the interface according to the interface display request, the method further comprises:
determining whether or not the at least one fingerprint acquisition area can respond to a touch event: and
if the at least one fingerprint acquisition area can respond to a touch event, activating the fingerprint recognition sensor corresponding to the at least one fingerprint acquisition area;
wherein said determining whether or not the at least one fingerprint acquisition area can respond to a touch event specifically comprises:
determining whether or not the at least one fingerprint acquisition area is shielded;
if the at least one fingerprint acquisition area is not shielded, determining whether or not the at least one fingerprint acquisition area is operable; and
if the at least one fingerprint acquisition area is operable, determining that the at least one fingerprint acquisition area can respond to a touch event.

11. The non-transitory computer readable storage medium according to claim 10, wherein the preset condition is that the interface display request contains a preset fingerprint identifier, and the fingerprint identifier is contained in the interface display request by: adding the fingerprint identifier in a description of an area requiring fingerprint acquisition of the interface display request;
said acquiring at least one fingerprint acquisition area according to the interface display request specifically comprises:
acquiring the at least one fingerprint acquisition area corresponding to the fingerprint identifier from the display interface request.

12. The non-transitory computer readable storage medium according to claim 10, wherein the fingerprint acquisition area is a rectangle, and said acquiring at least one fingerprint acquisition area according to the interface display request specifically comprises:
acquiring coordinates of two vertexes on a diagonal line of the at least one fingerprint acquisition area according to the interface display request.

13. The non-transitory computer readable storage medium according to claim 10, wherein said activating a fingerprint recognition sensor corresponding to the at least one fingerprint acquisition area specifically comprises:
transmitting driving parameters to a driving module; wherein the driving parameters include an activating instruction and information characterizing the at least one fingerprint acquisition area, and
activating the fingerprint recognition sensor corresponding to the at least one fingerprint acquisition area through the driving module.

* * * * *